United States Patent
Joubert et al.

[11] Patent Number: 5,940,050
[45] Date of Patent: *Aug. 17, 1999

[54] COLOR DISPLAY DEVICE FOR MONOVALVE PROJECTORS

[75] Inventors: Cécile Joubert, Paris; Brigitte Loiseaux, S/Yvette; Anne Delboulbe, Bagneux; Jean-Pierre Huignard, Paris, all of France

[73] Assignee: Thomson-CSF, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 08/786,251

[22] Filed: Jan. 22, 1997

Related U.S. Application Data

[63] Continuation of application No. 08/454,159, filed as application No. PCT/FR94/01258, Oct. 28, 1994, abandoned.

[30] Foreign Application Priority Data

Oct. 29, 1993 [FR] France ................... 93-12949

[51] Int. Cl.⁶ .............................. G09G 3/00
[52] U.S. Cl. .............................. 345/32; 345/88
[58] Field of Search ............... 345/30, 31, 32, 345/87, 48, 50, 88, 89, 92, 60, 22; 359/10, 20, 15, 22, 23, 69, 41; 348/40, 41; H04N 5/89

[56] References Cited

U.S. PATENT DOCUMENTS

| | | | |
|---|---|---|---|
| 4,007,481 | 2/1977 | St. John | 348/41 |
| 4,368,386 | 1/1983 | Huignard et al. | |
| 4,413,885 | 11/1983 | Hareng et al. | |
| 4,458,981 | 7/1984 | Huignard | |
| 4,492,468 | 1/1985 | Huignard et al. | |
| 4,592,618 | 6/1986 | Huignard et al. | 359/10 |
| 4,807,978 | 2/1989 | Grinberg et al. | 345/32 |
| 5,035,475 | 7/1991 | Lee et al. | 345/32 |
| 5,161,042 | 11/1992 | Hamada | 359/41 |
| 5,181,054 | 1/1993 | Nicholas et al. | |
| 5,272,496 | 12/1993 | Nicholas et al. | |
| 5,272,551 | 12/1993 | Lehureau et al. | |
| 5,299,036 | 3/1994 | Nicholas | |
| 5,410,421 | 4/1995 | Huignard | |
| 5,467,206 | 11/1995 | Loiseaux et al. | |
| 5,506,701 | 4/1996 | Ichikawa | |

FOREIGN PATENT DOCUMENTS

| | | |
|---|---|---|
| 0002612 | 3/1989 | WIPO |
| 0009915 | 6/1992 | WIPO |

*Primary Examiner*—Chanh Nguyen
*Attorney, Agent, or Firm*—Oblon, Spivak, McClelland, Maier & Neustadt, P.C.

[57] ABSTRACT

The color display device includes at least a light source which emits at least two primary wavelengths and an array of holographic lenses (HL). Also included is a spatial light modulator (LCD) which includes one picture element (pixel) for each holographic lens with each pixel including one subpixel for each wavelength to be displayed. Each of the holographic lenses disperses the various wavelength and focuses each of them into one of the subpixels. The structure allows for a single lens structure for the various wavelengths.

14 Claims, 5 Drawing Sheets

COLOR DISPLAY DEVICE FOR MONOVALVE PROJECTORS

This application is a Continuation of application Ser. No. 08/454,159, filed on Jun. 15, 1995, now abandoned which is a 371 of PCT/FR94/01258 filed on Oct. 28, 1994.

BACKGROUND OF THE INVENTION

1. Field of the Invention

The invention relates to a colour display device for monovalve projectors, especially a trichromatic device, and to its method of production.

2. Discussion of the Background

In order to obtain large-sized video pictures, one alternative solution to the cathode-ray tube, which then becomes heavy and bulky, is projection using liquid-crystal valves (liquid-Crystal Display or LCD). An LCD projector operates according to the principle of a slide projector, the LCD valve or valves replacing the slides.

The colour picture may be obtained either from three monochromatic screens each illuminated by one of the three primaries, red, green or blue, or by a single valve whose pixels (picture elements) are equipped with colour filters which transmit only one of the primaries. One colour point then consists of three monochromatic subpixels.

The architecture of a monovalve projector, which uses a single valve with colour filters, is very simple. It comprises a lamp, an LCD valve and a projection objective. However, it also has a certain number of drawbacks including:

- a low light yield: approximately ⅔ of the light is stopped by the colour filters which let through only a single colour for which they have, in addition, a non-negligible absorption;
- the LCD valve is difficult to produce, on account of the delicate technology of colour filters inserted into the liquid-crystal cells.

The invention relates to a liquid-crystal-monovalve colour display device enabling these drawbacks to be alleviated.

SUMMARY OF THE INVENTION

The invention therefore relates to a colour display device characterized in that it comprises:

- at least one light source emitting several primary wavelengths;
- an array of holographic lenses;
- a spatial light modulator comprising one pixel (picture element) per lens, each pixel comprising one subpixel per primary wave to be displayed;
- each lens in the array dispersing and focusing the various primaries, each in a subpixel.

The invention also relates to a method of producing a colour display device, characterized in that:

- a layer of a holographic material is produced;
- a reference light wave and at least one cylindrical or spherical light wave are made to interfere in the layer of holographic material, both these waves having the same recording wavelength, thus producing at least one holographic lens which can be read again by a second light wave under conditions close to the Bragg conditions;
- a spatial light modulator is associated in the focal plane of the holographic lens for a chosen wavelength.

BRIEF DESCRIPTION OF THE DRAWINGS

The various subjects and characteristics of the invention will appear more clearly in the following description given by way of example and in the appended figures which represent:

FIG. 2b, the reading of the material recorded in FIG. 2a;

DESCRIPTION OF THE PREFERRED EMBODIMENT

Figure 1:
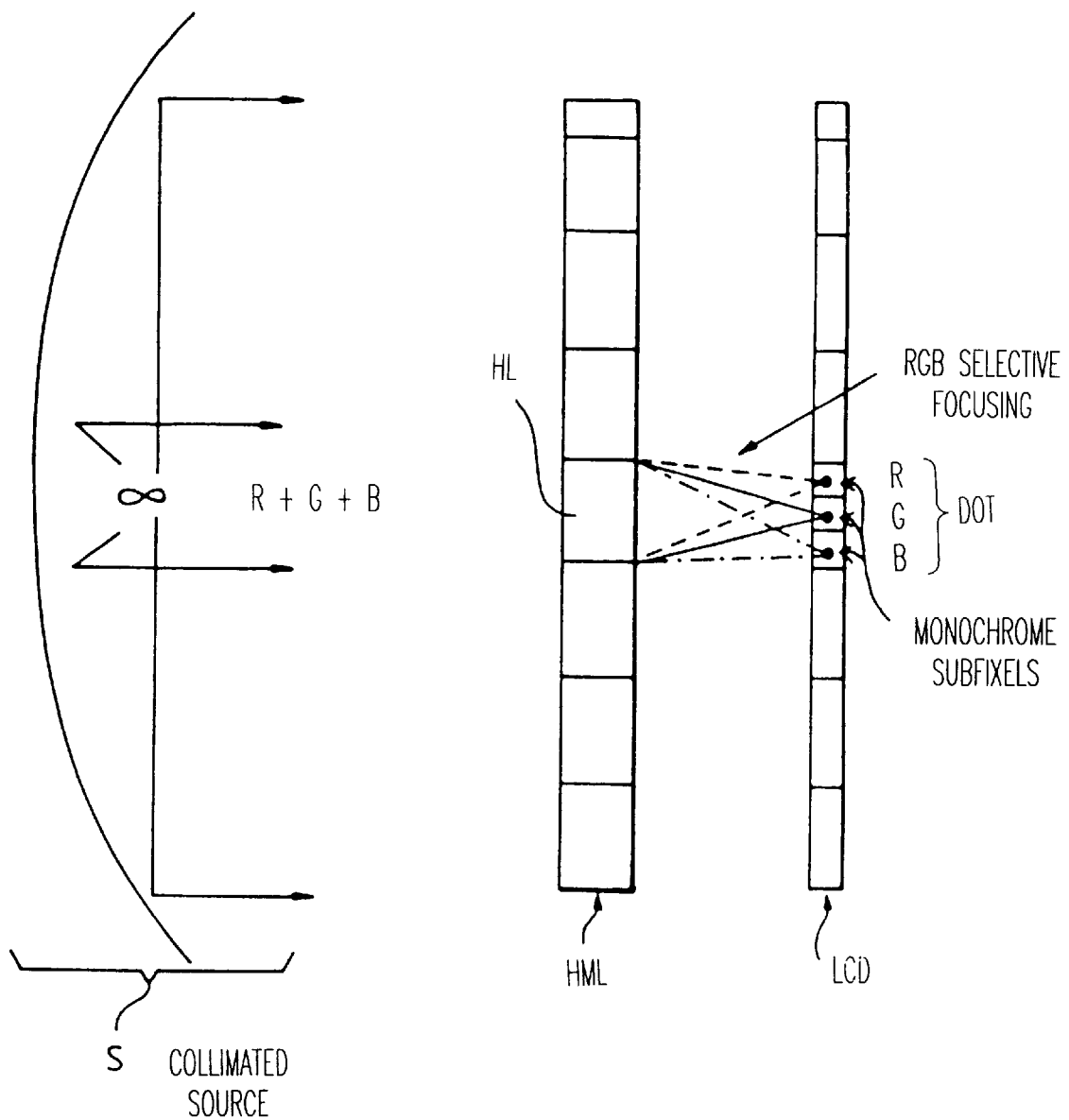
FIG. 1, an embodiment of the device according to the invention.

Referring to FIG. 1, an embodiment of the device of the invention will now be described.

This device comprises:

- a white source S comprising an optical system of the known art for collimating the light emitted by the source;
- a matrix HML of holographic microlenses HL enabling various wavelengths contained in the light emitted by the source to be selectively focused. Preferably, these wavelengths correspond to red, green and blue;
- a spatial light modulator, such as a liquid-crystal valve LCD controlled by trichromatic video signals RGB applied to the subpixels which constitutes it but is devoid of colour filters. More precisely, a subpixel of a colour point lies on the path of each beam, each corresponding to a primary focused by a lens in the matrix.

Let us recall that, in trichromatic screens, a pixel (picture element) emitting any light beam consists of three, red, green and blue, subpixels. Such a pixel is generally called a dot.

Figure 2A:
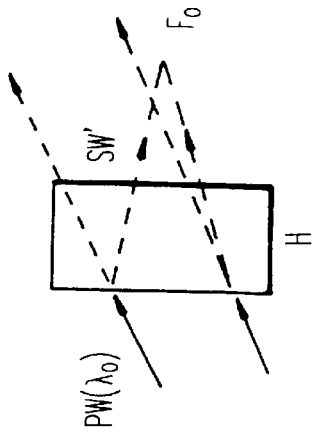
FIG. 2a, a method of recording an array of holographic lenses.

For one current application, there is just one matrix HML of holographic lenses LH which possesses a spectral bandwidth covering the entire visible spectrum. One elementary lens HL possesses a pupil equivalent to one dot. It is produced by recording the interference pattern between, for example, a monochromatic plane wave PW and a monochromatic spherical wave SW, both waves having a first wavelength $\lambda_0$ in a photosensitive material M which converts the light intensity modulation into a modulation of its refractive index (FIG. 2a).

Figure 2B:
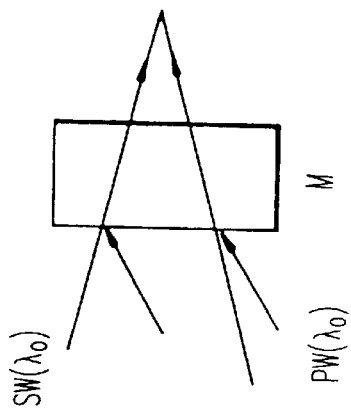

After development, the elementary lens HL, illuminated by a plane wave identical (in terms of angle of incidence and wavelength) to the wave PW, diffracts the wave SW' with an efficiency η which may range up to 100%. The lens HL then operates at the Bragg conditions (see FIG. 2b). The wave SW is focused at a point $F_0$. The material parameters to be optimized in order to obtain high efficiency are the thickness d, the index modulation An and the average spacing of the grating recorded.

Figure 3:
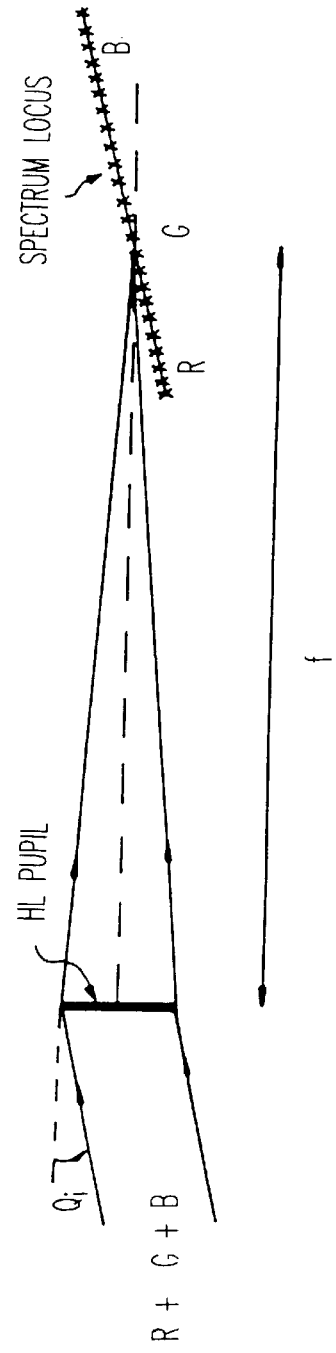
FIGS. 3 and 4, the reading with various wavelengths of a recorded lens.

If the lens HL is illuminated with a beam PW having the same angle of incidence but having another wavelength $\lambda_1 \neq \lambda_0$, the diffracted wave is focused at a point different from the focal point $F_0$ corresponding to the wave SW'. This chromatic dispersion of the component therefore has the effect of spatially spreading out the spectrum of a beam PW in the focal plane. The set of focal points corresponding to the visible wavelengths lies along a curve called the spectrum locus. FIG. 3 gives, by way of example, a cross-section of the spectrum locus.

Figure 4:
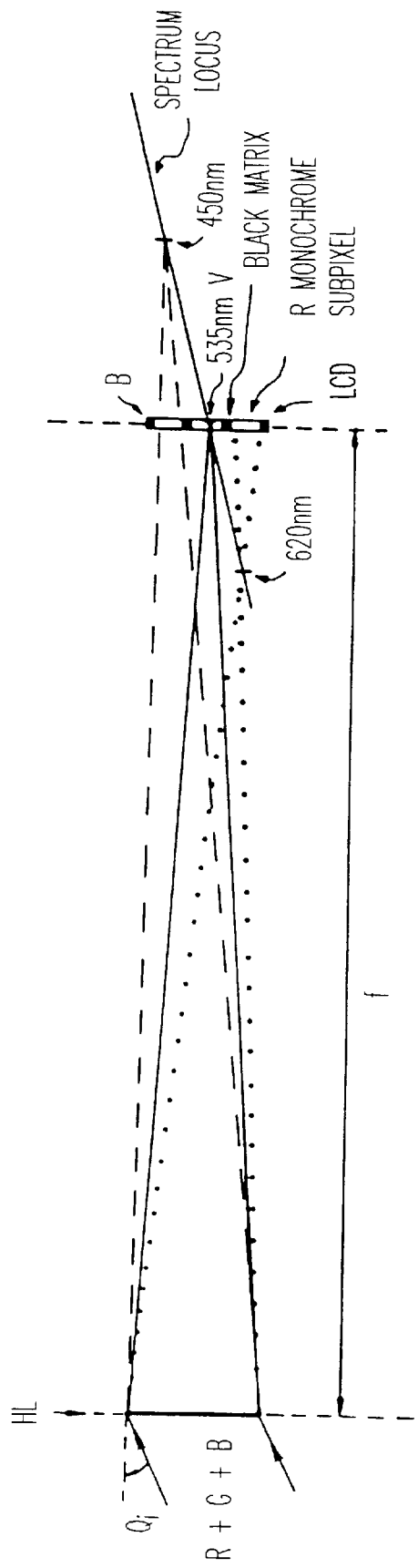

The invention exploits this property in order to split the three primaries over the three subpixels of a dot on an LCD screen, as shown in FIG. 4. In this case, the geometrical parameters of the lens are calculated so that the position of the focal points associated with the red, green and blue bands coincides with that of the corresponding subpixels. For a given pupil lens, the parameters to be adjusted are the angle of incidence of the plane wave, called the off-axis angle $\theta_i$, and the focal length f.

Figure 5:
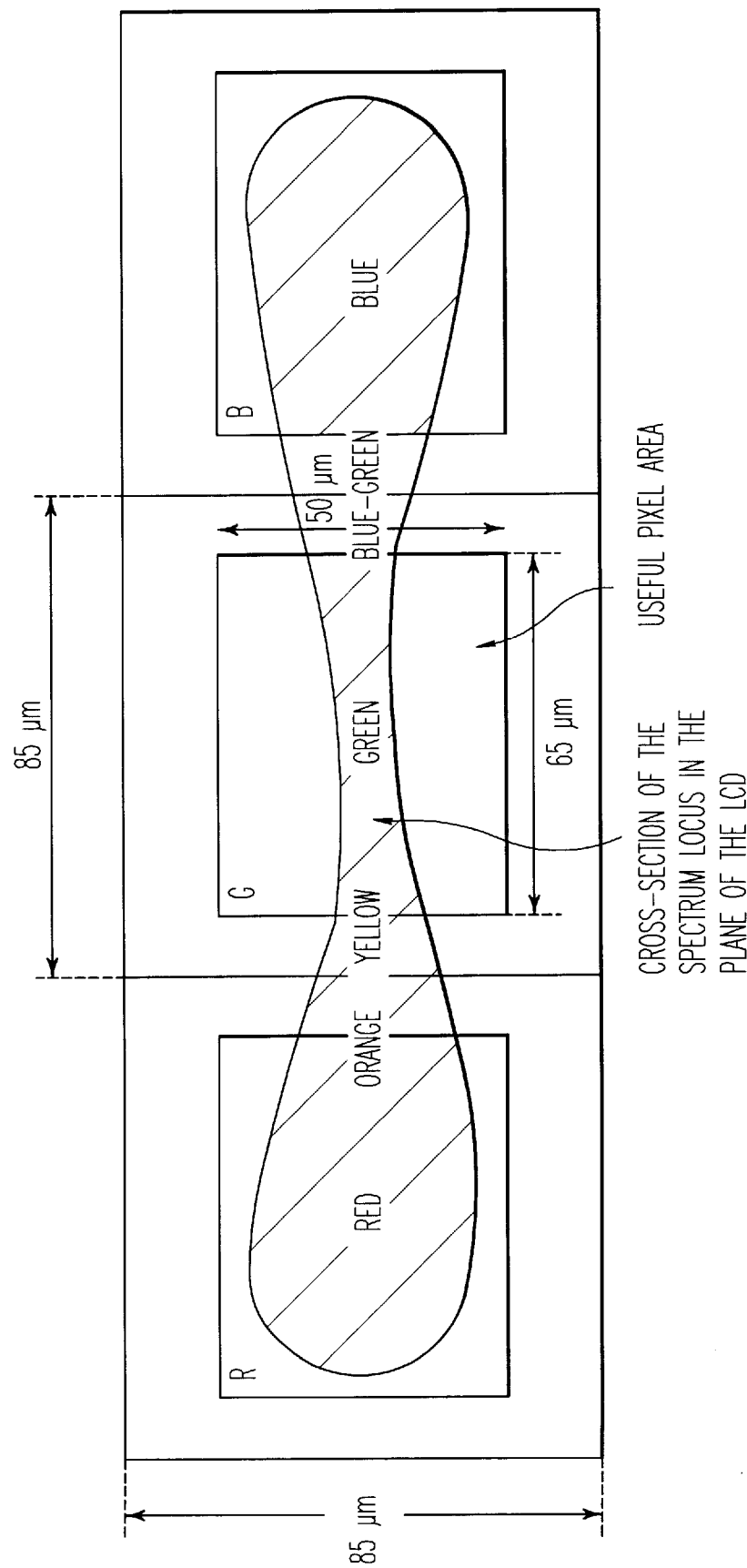
FIG. 5, a cross-section in the plane of the spatial light modulator of a trichromatic beam after passing through a holographic lens according to the invention.

In this case, the black matrix can be used, or possibly precalculated, so as to produce part or all of the colorimetric spectral filtering of the source (cf. FIGS. 4 and 5).

We shall now describe an example of a device associated with an example of a liquid-crystal screen possessing red, green and blue (RGB) subpixels distributed in vertical bands.

Characteristics of the liquid-crystal screen

16/9 format diagonal D=3.7 inches, i.e. a screen 46 mm in height and 82 mm in length;

distribution of the pixels over 560 lines of 320 RGB dots (960 subpixels). The corresponding subpixel size is therefore 85×85 $\mu$m;

aperture ratio of the pixel, through which the light is transmitted, of 45% for the pixel geometry described in FIG. 5. The useful area of a subpixel is 65 $\mu$m horizontally and 50 $\mu$m vertically.

Geometrical parameters of the holographic lens

Geometrical parameters: $\Theta i$ and f.

The height of the pupil $\Phi$ of an elementary lens in the matrix HML of holographic lenses corresponds to the height of 3 pixels, i.e. 3×85 $\mu$m in the example. In this example, the focal length will be at least equal to 1100 $\mu$m, the current standard thickness of the counter-plate of the liquid-crystal screen LCD.

FIG. 4 shows the operating point associated with the liquid-crystal screen LCD chosen in the example:

$\Theta i=15°$ $f=8\times\Phi=2040$ $\mu$m the focal point on the axis corresponds to $\lambda=535$ nm.

The dispersion is adjusted so that each spectral band is distributed spatially within a subpixel. FIG. 5 shows the cross-section through the focal plane in the plane of the screen LCD.

According to a preferred embodiment of the invention, in order to display using a range of wavelengths lying between two wavelengths $\lambda_1$ and $\lambda_2$ (for example, $\lambda_1=620$ nm and $\lambda 2=450$ nm), each lens HL in the matrix HML is recorded with light beams PW and SW having a wavelength $\lambda_0$ substantially equal to the mean of the wavelengths $\lambda_1$ and $\lambda_2$ (in the example taken, $\lambda_0 \approx (620+450)/2=535$ nm). According to a preferred embodiment, the axis of the beam SW is perpendicular to the plane of the matrix HML. Next, for displaying a liquid-crystal screen, the liquid-crystal screen LCD is placed so that each subpixel intended to modulate the wavelength $\lambda_0$ is located at the focal point of the wave at the wavelength $\lambda_0$ transmitted by each lens. In addition, the liquid-crystal screen can be oriented substantially in a plane perpendicular to the optical axis of each lens HL. A dot will therefore consist of a central subpixel G, in which the light close to the wavelength $\lambda_0$ will be focused, and of two side subpixels R and B receiving substantially the same quantity of light at the wavelengths close to $\lambda_1$ and $\lambda_2$ respectively.

In an alternative embodiment, the matrix of holographic lenses is in fact an array of juxtaposed parallel cylindrical lenses. Each lens therefore transmits a flat light beam for each wavelength. For a lens HL, for example, the beam of wavelength $\lambda_0$ is focused in a line lying in the plane of the screen LCD. The subpixels G of the screen LCD are then aligned along this line. The beams of wavelengths $\lambda_1$ and $\lambda_2$ are parallel to the beam of wavelength $\lambda_0$. The subpixels R and B are arranged along lines parallel to the line of subpixels G and on either side of this line.

In the foregoing, the screen LCD was regarded as a liquid-crystal screen, but it could be any other spatial light modulation device.

Parameters of the holographic material

For the lens HL, it is endeavoured to obtain a bandwidth $\Delta \lambda$ equal to the entire visible spectrum, with a maximum efficiency of 100% at a wavelength optimized for colorimetry, for example the green central wavelength of 535 nm. By way of example, and for the above operating point, it will be possible to choose the ($\Delta$n,d) pair as follows:

d=10 $\mu$m $\Delta$n=0.025

These values are compatible with holographic materials such as bichromated gelatine or photopolymers.

The device for illuminating the LCD proposed here enables a monovalve projector to be produced by associating it with a projection objective.

In order to optimize the projected flux, it may be necessary to include in the projection device either a field lens behind the LCD or a second matrix of lenses HL which is positioned after the screen LCD, each of the lenses HL acting as a field lens.

The system may be adapted to any configuration of colour pixels (delta, etc.) as soon as there is a direction along which the subpixels of the same colour are aligned.

The invention may also apply to direct-viewing screens.

Figure 6:
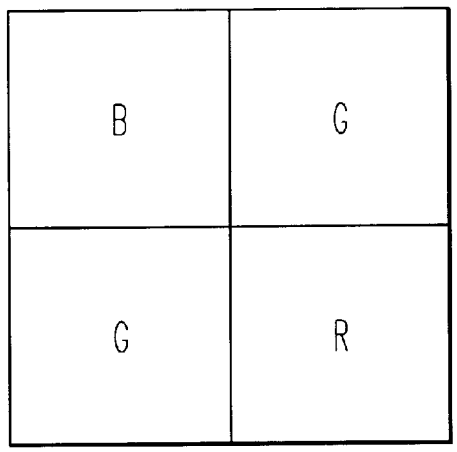
FIGS. 6 to 8, the application of the invention to quads.

The device of the invention can be generalized to any device including an LCD screen without colour filters and:

either a number of matrices of HLs that is less than the number of subpixels forming a white dot. For example, for the quad-configured structure (see FIG. 6), it is possible to superpose 2 matrices, HML1 and HML2 (cf. FIG. 7), one (HML 1) diffracting 100% of the red and 50% of the green and the other (HML2) 100% of the blue and 50% of the green, or a single matrix, but one in which each lens consists of several HLs. For example, for a quad-configured pixel structure, the elementary pattern of the matrix may consist (see FIG. 8a) of a lens HL1 dispersing the blue and green and a lens HL2 dispersing the red and green, each having a matched spectral bandwidth. Note that, in this case, half of the blue and half of the red is lost.

Figure 7:
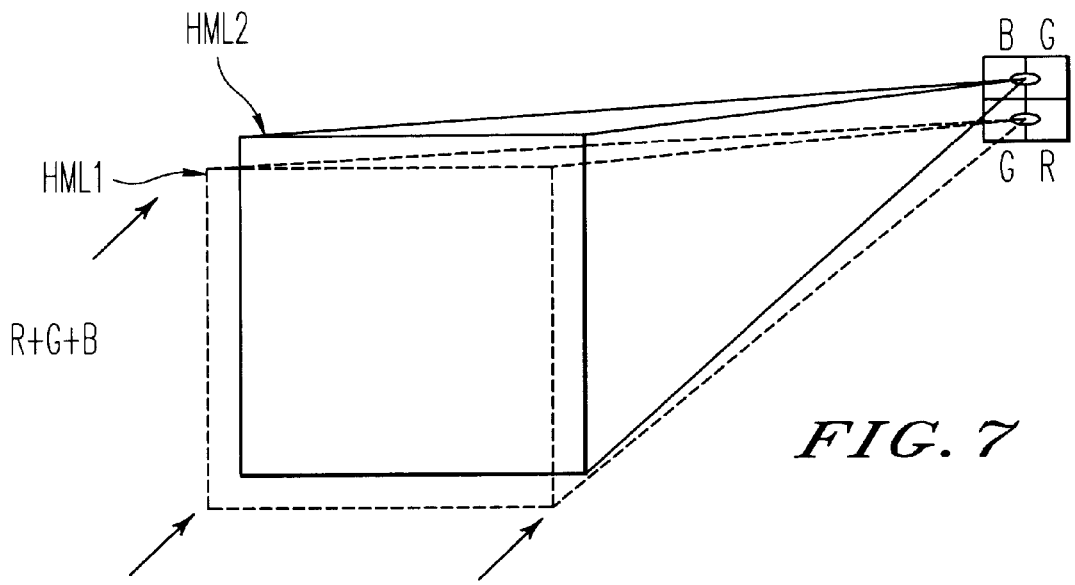

In the device of FIG. 7, the two holographic-lens matrices HML1 and HML2 have different characteristics. They are recorded separately in such a way that, when combined as shown in FIG. 7, they for example enable quads to be displayed, such as the quad shown in FIG. 6.

Figure 8:
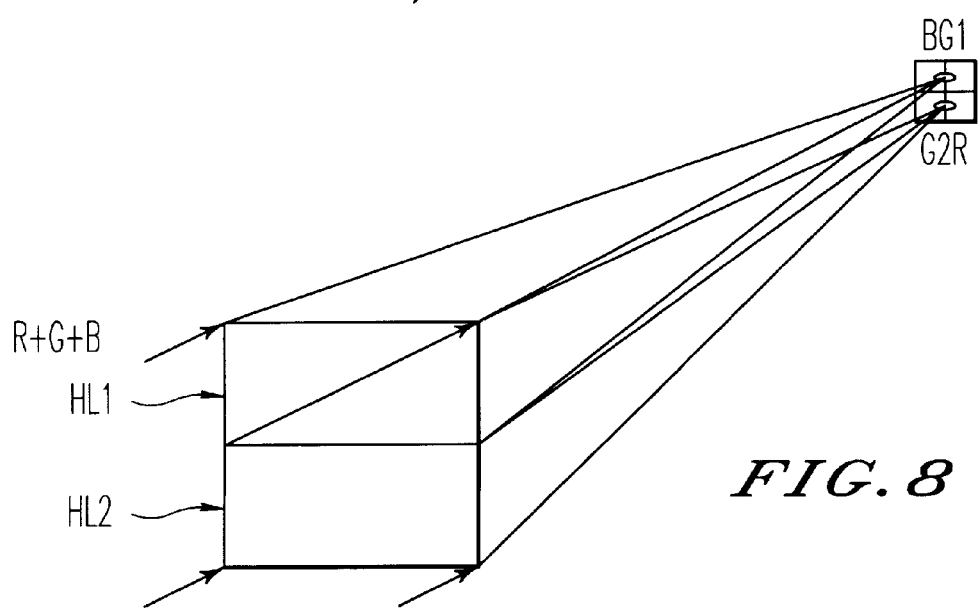

The device of FIG. 8 is made of a single material. However, the equivalent of each lens HL forming the subject of the description given above in relation to FIGS. 1 to 5 is recorded in the form of two juxtaposed lenses HL1 and HL2. The bandwidth of the lens HL1 is calculated so that it focuses only the wavelengths lying in the blue range and the wavelengths lying in the green range. On reading, the lens will therefore diffract light towards the point G1 for the G wavelength light and towards the point B for the B wavelength light.

The bandwidth of the lens HL2 is calculated so that it focuses only the wavelengths lying in the red range and those lying in the green range. On reading, the lens HL2 will therefore transmit the G and R wavelengths respectively towards the points G2 and R. FIG. 8 shows the points B, G1, G2 and R producing the quad of FIG. 6. In this case, note that the red part not diffracted by HL1 and the blue part not diffracted by HL2 are lost.

The invention described thus enables each primary of the source to be selectively focused simultaneously towards the pixel addressed by the video signal corresponding to it using a single matrix of holographic lenses. The invention enables a brightness gain of 4 to 8 to be achieved in a monovalve projector by replacing the matrix of colour filters of a trichromatic electrically-driven LCD screen with a single matrix of holographic microlenses that is positioned outside the liquid-crystal cell. In addition, the method for producing the display device is significantly simplified by the fact of dispensing with colour filters.

In the foregoing, trichromatic display devices were described by way of example, but the invention is applicable to a bichromatic (for example blue and green) display device for using two display screens.

We claim:

1. Color display device, comprising:
    at least one light source (S) emitting a beam comprising at least two primary wavelengths ($\lambda_1, \lambda_2$);
    a single array (HML) of holographic lenses (HL) wherein said at least two primary wavelengths enter said lenses at the same angle and wherein each of said lenses diffracts different wavelengths in a different direction;
    a spatial light modulator (LCD) comprising one pixel per lens, each pixel comprising one subpixel per primary wave to be displayed; the lenses (HL) of the array (HML) dispersing said at least two primary wavelengths and focusing each of said two primary wavelengths in a subpixel, the spatial light modulator being transmissive elements and approximately perpendicular to an axis of said lenses and being located at a focal point of a medium wavelength $\lambda_0 \approx (\lambda_1 + \lambda_2)/2$, the at least two primary wavelengths focusing in planes located on both sides of the spatial light modulator.

2. The device according to claim 1, wherein:
    the light source (S) emits at least mainly three wavelengths (R, G, B) each corresponding to a primary wavelength of the color spectrum;
    each lens (HL) focuses a wavelength beam intermediate between the two extreme primary spectral bands (R, B) in the plane of the spatial light modulator (LCD)'
    the spatial light modulator (LCD) is oriented in a plane perpendicular to the optical axis of the intermediate wavelength beam or slightly inclined at an angle enabling the best contrast of the modulator to be obtained;
    each picture element (pixel) of the spatial light modulator comprises three subpixels, each of said three receiving light having a spectral band which subpixels correspond to one of the primaries (R, G or B) and is transmitted by a lens (HL).

3. The device according to claim 2, characterized in that the mean wavelength lies within one of the three spectral bands (R, G, B).

4. Device according to claim 1, characterized in that the spatial light modulator (LCD) is a liquid-crystal screen.

5. The device according to claim 1, characterized in that the array (HML) of holographic lenses (HL) is an array of mutually parallel and juxtaposed cylindrical lenses.

6. The device according to claim 1, characterized in that the array (HML) of holographic lenses (HL) is a matrix of spherical lenses.

7. The device according to claim 1, characterized in that the array (HML) of holographic lenses is illuminated by the source (S) in such a way that said lenses can operate at the Bragg conditions for the said wavelength ($\lambda_0$).

8. The device according to claim 1, wherein said array comprises two juxtaposed arrays (HML1, HML2) of holographic lenses, a first array diffracting 100% of the light at a shortest wavelength (B) and 50% of the light at a mean wavelength (G) and a second array diffracting 100% of the light at a longest wavelength (R) and 50% of the light at the mean wavelength (G).

9. Device according to claim 1, characterized in that each lens (HL) comprises two elementary lenses (HL1, HL2), the two elementary lenses diffracting the said wavelengths ($\lambda_0$) into two beams that are focused at two points spatially offset in the focal plane (P).

10. A method of producing a color display device, comprising the steps of:
    producing a layer of a holographic material;
    providing a first reference wave (PW) and at least one cylindrical or spherical light wave (SW) and causing said first reference light wave and said at least one cylindrical or spherical light wave to interfere in the layer of holographic material, both of said reference light wave and said at least one cylindrical or spherical light wave having the same recording wavelength to produce at least one holographic lens which can be read by another light wave at another wavelength in conditions proximal to Bragg conditions wherein each one of said at least one holographic lens receives light having at least two wavelengths with each wavelength of light entering each of said at least one holographic lens at the same angle and diffracts different wavelengths in different directions;
    associating a spatial light modulator (LCD) in the focal plane of the holographic lens corresponding to a chosen wavelength wherein said spatial light modulator includes one holographic lens for each pixel wherein each pixel includes as many subpixels as there are primary colors, the central subpixel of each pixel being located at the focal point of the wave having a wavelength substantially equivalent to the center wavelength of the visible spectrum and the plane of the spatial light modulator being perpendicular to the optical axis of said central subpixel wave.

11. The method according to claim 10, characterized in that the reference light wave (PW) and the cylindrical or spherical light wave have a wavelength substantially equal to the mean of the wavelengths to be displayed.

12. The method according to claim 10, characterized in that the at least one cylindrical or spherical light wave is similar, in terms of direction and of wavelength, to the reference light wave (PW).

13. The method according to claim 10, characterized in that the reference light wave is a plane wave.

14. The method according to claim 10, characterized in that the reference wave is not plane but calculated so as to take into account an angular distribution of an illumination source in the region of the LCD.

* * * * *